United States Patent [19]

Nishizawa

[11] Patent Number: 5,210,665
[45] Date of Patent: May 11, 1993

[54] FLOPPY DISK APPARATUS HAVING AN IMPROVED DISK ROTATING MECHANISM

[75] Inventor: Hiroshi Nishizawa, Hanamaki, Japan

[73] Assignee: Matsushita Electric Industrial Co., Ltd., Osaka, Japan

[21] Appl. No.: 666,517

[22] Filed: Mar. 11, 1991

[30] Foreign Application Priority Data

Mar. 16, 1990 [JP] Japan .................................. 2-67747

[51] Int. Cl.⁵ .............................................. G11B 17/02
[52] U.S. Cl. .............................. 360/99.08; 360/97.01; 360/97.04; 360/99.01
[58] Field of Search ............... 360/110, 130.24, 137, 360/102, 95, 84, 130.22, 108, 107, 97.01, 99.08, 99.01, 133

[56] References Cited

U.S. PATENT DOCUMENTS

| | | | |
|---|---|---|---|
| 4,363,047 | 12/1982 | Maruyama et al. | 360/102 |
| 4,366,519 | 12/1982 | Maruyama et al. | 360/130.24 |
| 4,497,002 | 1/1985 | von der Heide et al. | 360/99.08 |
| 4,651,241 | 3/1987 | von der Heide et al. | 360/99.08 |
| 4,706,143 | 11/1987 | Asada et al. | 360/130.24 |
| 4,874,976 | 10/1989 | Ohsawa et al. | 360/97.01 |
| 5,019,926 | 5/1991 | Van Thuijl et al. | 360/130.24 |

FOREIGN PATENT DOCUMENTS 59-63024 4/1984 Japan .................................. 360/102
61-269286 11/1986 Japan .................................. 360/102

*Primary Examiner*—Stuart S. Levy
*Assistant Examiner*—Alfonso Garcia
*Attorney, Agent, or Firm*—Stevens, Davis, Miller & Mosher

[57] ABSTRACT

A magnetic recording/reproduction apparatus including a motor for rotating a magnetic recording medium such as a floppy disk. The motor has a rotating shaft, a pivot bearing member for supporting the rotating shaft in a thrust direction; a dynamic pressure type radial fluid bearing for rotatably supporting the rotating shaft through a lubricant inside its sleeve, a stator attached to the radial fluid bearing, coils provided on the stator; a rotor fixed to the rotating shaft, and a magnet attached to the rotor. The rotor may have a flange-like engagement portion capable of engaging with a stopper portion formed in a predetermined position to prevent the rotating shaft from coming off the bearing. Preferably, the pivot bearing member is formed of a material having a Vickers hardness of 1200 or higher and is fixed to the sleeve by caulking, the ratio of the diameter of the rotating shaft and the length of the radial fluid bearing in the thrust direction is 1:0.8 to 2, and the diameter of the rotating shaft is not greater than 4.0 mm. The engagement portion at the outer end of the rotor may be constituted by a frequency generator magnet.

25 Claims, 2 Drawing Sheets

5,210,665

FLOPPY DISK APPARATUS HAVING AN IMPROVED DISK ROTATING MECHANISM

BACKGROUND OF THE INVENTION

This invention relates to a magnetic recording/reproduction apparatus such as a floppy disk unit for use in an external storage of a computer or the like and, more particularly, to a motor for rotating a disk-like magnetic recording medium such as a floppy disk.

A conventional motor of this kind is known which has a construction such as that shown in FIG. 4. As shown in FIG. 4, a bearing housing 52 is provided integrally with a base 51, and outer races 54 of a pair of ball bearings 53 are fixed in the bearing housing 52 in a two-stepped manner. A rotating shaft 56 is fixed to inner races 55 by press fitting or bonding and is rotatably supported by the ball bearings 53. A stator 57 is attached to an outer peripheral portion of the bearing housing 52 by screws 58, and coil windings 59 are provided on the stator 57. A rotor 61 is fixed to a top end portion of the rotating shaft 56 through a bush 60. A magnet 62 having a magnetic field extending across the stator 57 is attached to the inner surface of an outer circumferential portion of the rotor 61.

The rotating members including the magnet 62, the rotor 61 and the rotating shaft 56 are rotated by causing a current to flow through the coil windings 59. By this rotation, the floppy disk (not shown) is rotated for recording or reproduction of information on or from the floppy disk.

Another conventional motor is known which has a construction wherein an oilless metal is used instead of one of the ball bearings to rotatably support the rotating shaft 56.

In the above-described constructions of the conventional motors, however, there is a gap between the rotating shaft 56 and the inner diametral surfaces of the inner races 55 of the ball bearings 53, and there is also a play in the radial direction in the ball bearings 53. For this reason, if the span between the bearings for supporting the rotating shaft 56 is reduced, the extent of whirling of the rotating shaft 56 is increased and the accuracy of the attitude of the rotating shaft 56 is reduced, resulting in failure to achieve the desired functions of the floppy disk unit. To maintain the desired accuracy with which the rotating shaft 56 rotates, it is necessary to set the bearing span to a substantially large distance. Accordingly, it is difficult to reduce the size of the floppy disk unit by reducing the overall thickness. There is also the problem of a comparatively short life of the ball bearings 53.

SUMMARY OF THE INVENTION

In view of these problems of the prior art, an object of the present invention is to provide a magnetic recording/reproduction apparatus which is capable of rotating the rotating shaft with high accuracy while reducing the bearing span, which can therefore be reduced in overall thickness, and which can be designed so as to extend the life and to reduce the level of noise generated by the bearing.

To achieve this object, according to the present invention, there is provided a magnetic recording/reproduction apparatus including a rotating shaft for rotating a disk-like magnetic recording medium; a pivot bearing member for supporting the rotating shaft in a thrust direction; a dynamic pressure type radial fluid bearing for rotatably supporting the rotating shaft through a lubricant inside its sleeve; a stator attached to the radial fluid bearing; a coil means provided on the stator; a rotor fixed to the rotating shaft; and a magnet means attached to the rotor.

The rotor may have an engagement portion projecting from its outer end and capable of engaging with a stopper portion formed in a predetermined position.

Preferably, the pivot bearing member is formed of a material having a Vickers hardness of 1200 or higher. The pivot bearing member can be fixed to the sleeve by caulking. Also, preferably, the ratio of the diameter of the rotating shaft and the length of the radial fluid bearing in the thrust direction is 1:0.8 to 2, and the diameter of the rotating shaft is not greater than 4.0 mm. The engagement portion at the outer end of the rotor can be constituted by a magnet for a frequency generator.

According to the present invention, as the magnet, the rotor and the rotating shaft rotate by a current flowing through the coil, a dynamic pressure of the lubricant is produced in the sleeve of the radial fluid bearing, and the rotating shaft can rotate without contacting the sleeve by being supported through the lubricant. The rotating shaft can therefore be rotated with high accuracy by the cooperation of the radial fluid bearing and the pivot bearing, even if the bearing span is small.

BRIEF DESCRIPTION OF THE DRAWINGS

FIG. 1 is a cross-sectional view showing essential portions;

FIG. 2 is a cross-sectional view of details of a bearing portion;

DESCRIPTION OF THE PREFERRED EMBODIMENTS

Embodiments of the present invention will be described below with reference to the accompanying drawings.

Figure 1:
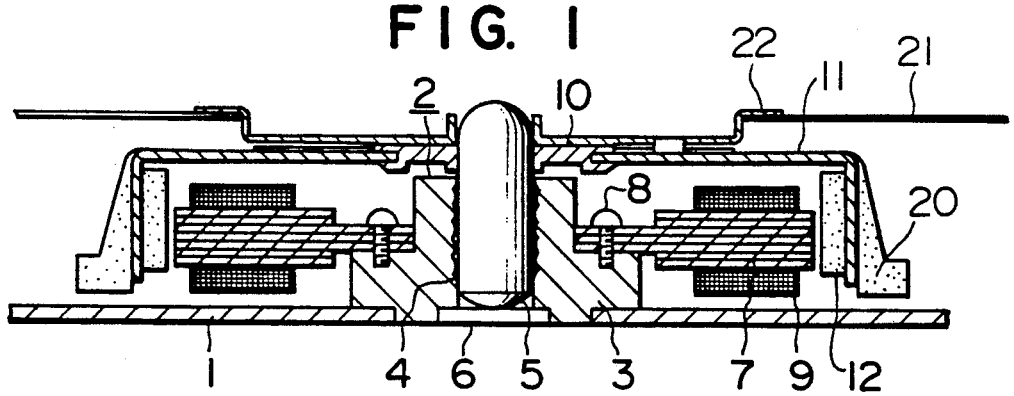
FIGS. 1 and 2 show a magnetic recording/reproduction apparatus in accordance with a first embodiment of the present invention.
Figure 2:
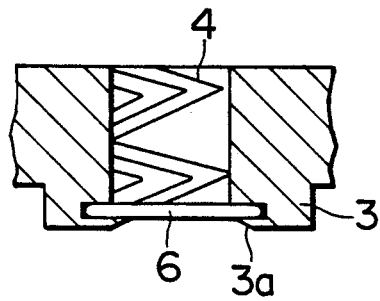

Referring to FIG. 1, a magnetic recording/reproduction apparatus in accordance with the first embodiment of the present invention has a base 1 and a dynamic pressure type radial fluid bearing 2 provided on the base 1. Floppy disk 21 is supported on the disk unit. A sleeve 3 is fixed on the base 1, herringbone type helical grooves 4 (refer to FIG. 2) are formed in the inner circumferential surface of the sleeve 3, and the gap between the sleeve 3 and a rotating shaft 5 inserted in the sleeve 3 is filled with a lubricant (lubricating oil). As the rotating shaft 5 rotates, a dynamic pressure (pumping pressure) of the lubricant is produced by the effect of the herringbone type helical grooves 4. This dynamic pressure of the lubricant enables the rotating shaft 5 to be supported with high accuracy and without contacting the sleeve 3. A pivot bearing member 6 is fixed in a base end portion of the sleeve 3 by a caulked portion 3a (refer to FIG. 2) to form a pivot bearing in which a spherical surface portion of the rotating shaft 5 formed on the base end side abuts against the pivot bearing member 6 through the lubricant in a point contact manner. The rotating shaft 5 is thereby supported in a thrust direction. A stator 7 is attached to an outer circumferential portion of the sleeve 3 by screws 8, and coil windings 9 are provided on the stator 7. A rotor 11 is fixed to a top end portion of the rotating shaft 5 through a bush 10. A magnet 12 having a magnetic field extending across the stator 7 is attached to the inner surface of an outer circumferential portion of the rotor 11. The magnet 12 and the stator 7 are slightly shifted from each other in the axial direction of the rotating shaft 5 to produce a magnetic thrust whereby the rotating shaft 5 is brought into contact with the pivot bearing member 6.

The pivot bearing member 6 can be formed of a ceramic or the like, and it is possible to make the entire rotor 11 assembly including the rotating shaft 5 electrically short-circuited or open by using an electroconductive cermet or an alumina having an insulating property.

The operation of the thus-constructed apparatus will be described below.

The rotating members including the magnet 12, the rotor 11 and the rotating shaft 5 pressed against the pivot bearing member 6 by the magnetic thrust force are rotated by causing a current to flow through the coil windings 9. The floppy disk (not shown) is thereby rotated for recording or reproduction of information on or from the floppy disk. At this time, the dynamic pressure of the lubricant in the dynamic pressure type radial fluid bearing 2 produced as described above enables the rotating shaft 5 to be rotated with high accuracy and without contacting the sleeve 3. It is therefore possible to extend the life of the bearing and to reduce the level of noise caused during rotation as well as to improve the accuracy.

Preferably, in this embodiment, the pivot bearing member 6 which supports the rotating shaft 5 in the thrust direction is formed of a material including a ceramic or the like having a Vickers hardness of 1200 or higher, the ratio of the diameter of the rotating shaft 5 and the length of the sleeve 3 in the thrust direction is 1:0.8 to 2, and the diameter of the rotating shaft 5 is not greater than 4.0 mm. Also, the gap between the sleeve 3 and the rotating shaft 5 and the viscosity of the lubricant may be selected to control the bearing stiffness. The motor is thus constructed to have a short bearing span.

Figure 3:
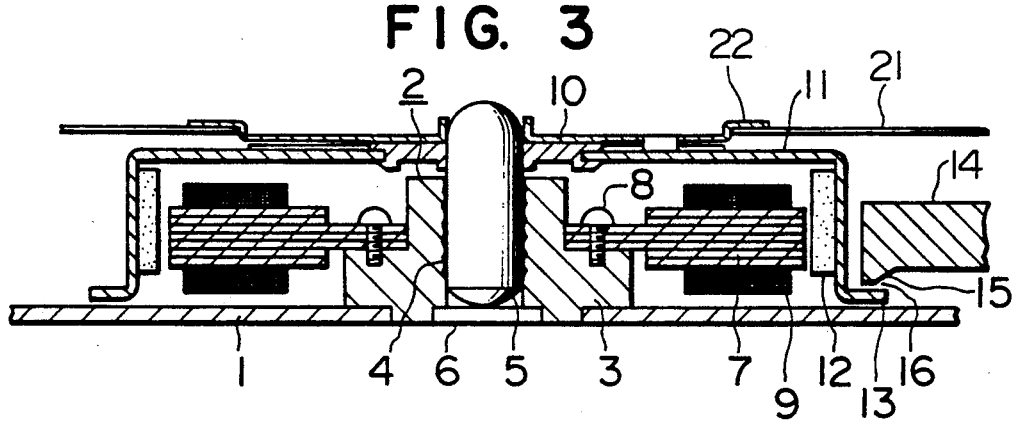
FIG. 3 is a cross-sectional view of essential portions of a magnetic recording/reproduction apparatus in accordance with a second embodiment of the present invention.
Figure 4:
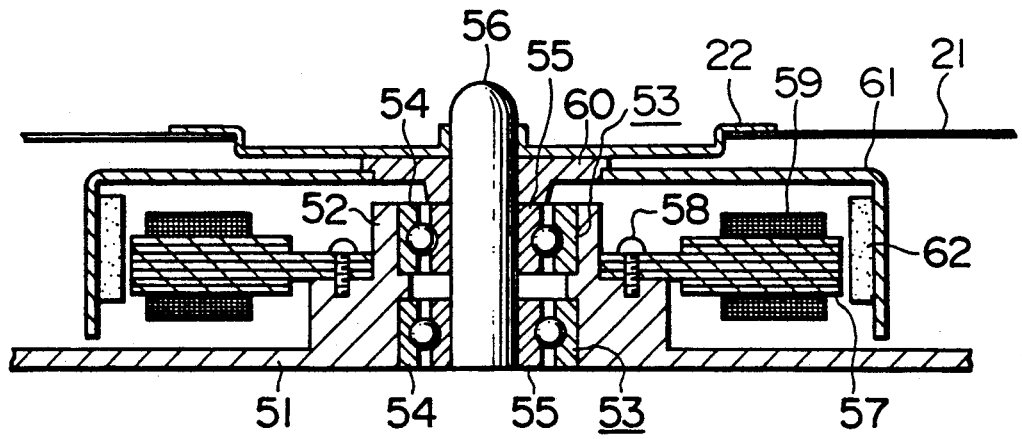
FIG. 4 is a cross-sectional view of essential portions of the conventional magnetic recording/reproduction apparatus.

The second embodiment of the present invention will be described below. FIG. 3 is a cross-sectional view of essential portions of a magnetic recording/reproduction apparatus in accordance with the second embodiment.

In the first embodiment, there is a risk of the rotating shaft 5 coming off the dynamic pressure type radial fluid bearing 2, if an external force is applied which can move the rotating shaft 5 in the direction of the top end thereof relative to the rotor 11. To prevent this risk, the magnetic thrust force applied by the magnet 12 in the rotor 11 may be increased or a groove (not shown) may be formed in the rotating shaft at an intermediate position with a ring (not shown) engaged with this groove. However, if the magnetic thrust force is increased, the friction between the rotating shaft 5 and the pivot bearing consisting of the pivot bearing member 6 is so large that the life of the bearing is reduced by abrasion, or the total manufacturing cost is increased. The second embodiment is arranged to avoid the above risk without increasing the magnetic thrust force. That is, abrasion of the rotating shaft 5 and the pivot bearing member 6 is prevented to ensure a long life while limiting the manufacturing cost.

In the second embodiment, as shown in FIG. 3, a flange-like engagement portion 13 is provided which projects from an outer circumferential end portion of the rotor 11 closer to the base 1, while a stopper portion 15 capable of stopping the engagement portion 13 from coming off is formed in a predetermined position on a base 14. The arrangement is such that in an ordinary state where no external force is applied to the rotor 11, a gap 16 is formed between the stopper portion 15 and the engagement portion 13. Except for these portions, the construction of this embodiment is the same as that of the first embodiment.

The operation of this embodiment will be described below.

The rotating members including the magnet 12, the rotor 11 and the rotating shaft 5 pressed against the pivot bearing member 6 by the magnetic thrust force are rotated by causing a current to flow through the coil windings 9, as in the case of the first embodiment. The floppy disk (not shown) is thereby rotated for recording or reproduction of information on or from the floppy disk.

If during this operation an external force is applied to the rotor 11 in the thrust direction (upward as viewed in FIG. 3), the magnetic thrust force applied to the stator 7 by the magnet 12 first resists the external force. If the external force applied to the rotor 11 is increased, the rotor 11 and the rotating shaft 5 and so on are moved in the thrust direction (upward) so that the rotating shaft 5 starts coming off the radial fluid bearing 2 and that the gap 16 between the engagement portion 13 of the rotor 11 and the stopper portion 15 of the base 14 is reduced. The engagement portion 13 of the rotor 11 then contacts the stopper portion 15 to stop the rotating shaft 5 from coming off. If the external force to the rotor 11 is removed, the rotor 11, the rotating shaft 5 and so on are moved downward by the magnetic thrust force to be returned to the normal position at which the base end of the rotating shaft 5 abuts against the pivot bearing member 6.

Thus, in accordance with this embodiment, the rotor 11 is provided with the engagement portion 13 while the stopper portion 15 is provided at the predetermined position, whereby the rotating shaft 5 can be prevented from coming off the radial fluid bearing 2 even when an external force greater than the magnetic thrust force is applied to the rotor 11. Consequently, the rotating shaft 5 can be prevented from coming off without unnecessarily increasing the magnetic thrust force applied to the stator 7 by the magnets 12, and the thrust force is optimized to limit wear in the pivot bearing and to extend the life of the bearing. Also, there is no need to form a groove in the rotating shaft 5 and to set a ring in engagement with this groove, and each of the engagement portion 13 and the stopper portion 15 can easily be formed when the rotor 11 or the base 14 is manufactured, thus limiting the increase in manufacturing cost.

Figure 5:
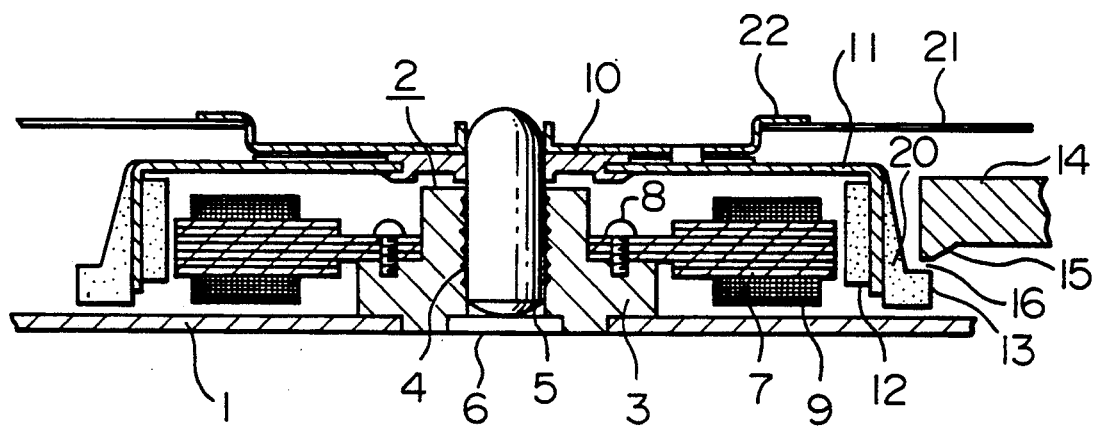
FIG. 5 is a modified version of the second embodiment wherein a frequency generator magnet detects the rotational speed of the rotor and as the engagement portion of the rotor.

Since in this embodiment the engagement portion 13 is formed into a flange-like shape extending through the whole circumference of the rotor 11, it is not necessary for the stopper portion 15 of the base 14 to be formed into a ring-like shape; one or a plurality of stopper portions 15 may be formed so as to contact the engagement portion 13 at one or a plurality of positions. Conversely, if one engagement portion 13 is formed so as to partially cover the outer circumference of the rotor 11 or if a plurality of engagement portions 13 are formed therealong, the stopper portion 15 on the base 14 may be formed into a ring-like shape. Also, FIG. 5 shows a frequency generator (FG) magnet 20 for detecting the rotational seed of the rotor and which providing an engagement portion 13 of the rotor 11.

In accordance with the present invention, as described above, the rotating shaft for rotating the disk-like magnetic recording medium is supported by the dynamic pressure type radial fluid bearing and the thrust-direction pivot bearing member. It is thereby possible to rotate the rotating shaft with high accuracy even if the radial fluid bearing has a small span and, hence, to reduce the overall thickness of the apparatus. Since the radial fluid bearing supports the rotating shaft in a non-contact manner and is substantially free from abrasion, the life of the bearing can be extended and the level of noise caused by the bearing can be reduced. Moreover, the rotor can easily be made electrically short-circuited or open by selecting the material of the pivot bearing member.

What is claimed is:

1. A floppy disk apparatus comprising:
a rotating shaft for rotating a disk-like magnetic recording medium;
a pivot bearing member for supporting said rotating shaft in a thrust direction;
a dynamic pressure type radial fluid bearing having a sleeve and rotatably supporting said rotating shaft through a lubricant inside said sleeve;
a stator attached to said radial fluid bearing;
coil means provided on said stator;
a rotor fixed to said rotating shaft; and
magnet means attached to said rotor wherein the dynamic pressure of said lubricant enables said rotating shaft to be supported with high accuracy and without contracting said sleeve.

2. A floppy disk apparatus according to claim 1, further comprising a stopper disposed at a predetermined position at a radially outer extremity of said rotor and wherein said rotor has a radially outwardly projecting engagement portion for engaging with said stopper portion wherein the dynamic pressure of said lubricant enables said rotating shaft to be supported with high accuracy and without contracting said sleeve.

3. A floppy disk apparatus according to claim 1, wherein said pivot bearing member is formed of a material having a Vickers hardness of 1200 or higher.

4. A floppy disk apparatus according to claim 2, wherein said pivot bearing member is formed of a material having a Vickers hardness of 1200 or higher.

5. A floppy disk apparatus according to claim 1, wherein said pivot bearing member is fixed to said sleeve by caulking.

6. A floppy disk apparatus according to claim 2, wherein said pivot bearing member is fixed to said sleeve by caulking.

7. A floppy disk apparatus according to claim 3, wherein said pivot bearing member is fixed to said sleeve by caulking.

8. A floppy disk apparatus according to claim 4, wherein said pivot bearing member is fixed to said sleeve by caulking.

9. A floppy disk apparatus according to claim 1, wherein said rotating shaft has a diameter enabling said shaft to be radially supported inside said sleeve and said sleeve has a length sufficient to support said rotating shaft in said thrust direction and wherein a ratio of the diameter of said rotating shaft and the length of said radial fluid bearing in the thrust direction is 1:0.8 to 2.

10. A floppy disk apparatus according to claim 2, wherein said rotating shaft has a diameter enabling said shaft to be radially supported inside said sleeve and said sleeve has a length sufficient to support said rotating shaft in said thrust direction and wherein a ratio of the diameter of said rotating shaft and the length of said radial fluid bearing in the thrust direction is 1:0.8 to 2.

11. A floppy disk apparatus according to claim 3, wherein said rotating shaft has a diameter enabling said shaft to be radially supported inside said sleeve and said sleeve has a length sufficient to support said rotating shaft in said thrust direction and wherein a ratio of the diameter of said rotating shaft and the length of said radial fluid bearing in the thrust direction is 1:0.8 to 2.

12. A floppy disk apparatus according to claim 4, wherein said rotating shaft has a diameter enabling said shaft to be radially supported inside said sleeve and said sleeve has a length sufficient to support said rotating shaft in said thrust direction and wherein a ratio of the diameter of said rotating shaft and the length of said radial fluid bearing in the thrust direction is 1:0.8 to 2.

13. A floppy disk apparatus according to claim 5, wherein said rotating shaft has a diameter enabling said shaft to be radially supported inside said sleeve and said sleeve has a length sufficient to support said rotating shaft in said thrust direction and wherein a ratio of the diameter of said rotating shaft and the length of said radial fluid bearing in the thrust direction is 1:0.8 to 2.

14. A floppy disk apparatus according to claim 6, wherein said rotating shaft has a diameter enabling said shaft to be radially supported inside said sleeve and said sleeve has a length sufficient to support said rotating shaft in said thrust direction and wherein a ratio of the diameter of said rotating shaft and the length of said radial fluid bearing in the thrust direction is 1:0.8 to 2.

15. A floppy disk apparatus according to claim 7, wherein said rotating shaft has a diameter enabling said shaft to be radially supported inside said sleeve and said sleeve has a length sufficient to support said rotating shaft in said thrust direction and wherein a ratio of the diameter of said rotating shaft and the length of said radial fluid bearing in the thrust direction is 1:0.8 to 2.

16. A floppy disk apparatus according to claim 8, wherein said rotating shaft has a diameter enabling said shaft to be radially supported inside said sleeve and said sleeve has a length sufficient to support said rotating shaft in said thrust direction and wherein a ratio of the diameter of said rotating shaft and the length of said radial fluid bearing in the thrust direction is 1:0.8 to 2.

17. A floppy disk apparatus according to claim 9, wherein said diameter of said rotating shaft is not greater than 4.0 mm.

18. A floppy disk apparatus according to claim 10, wherein said diameter of said rotating shaft is not greater than 4.0 mm.

19. A floppy disk apparatus according to claim 11, wherein said diameter of said rotating shaft is not greater than 4.0 mm.

20. A floppy disk apparatus according to claim 12, wherein said diameter of said rotating shaft is not greater than 4.0 mm.

21. A floppy disk apparatus according to claim 13, wherein said diameter of said rotating shaft is not greater than 4.0 mm.

22. A floppy disk apparatus according to claim 14, wherein said diameter of said rotating shaft is not greater than 4.0 mm.

23. A floppy disk apparatus according to claim 15, wherein said diameter of said rotating shaft is not greater than 4.0 mm.

24. A floppy disk apparatus according to claim 16, wherein said diameter of said rotating shaft is not greater than 4.0 mm.

25. A floppy disk apparatus according to claim 2, wherein the engagement portion of said rotor comprises a magnet serving also as a frequency generator.

* * * * *